United States Patent
Meyer

[11] Patent Number: 5,887,651
[45] Date of Patent: Mar. 30, 1999

[54] REHEAT SYSTEM FOR REDUCING EXCESSIVE HUMIDITY IN A CONTROLLED SPACE

[75] Inventor: Jeffrey R. Meyer, Minneapolis, Minn.

[73] Assignee: Honeywell Inc., Minneapolis, Minn.

[21] Appl. No.: 505,573

[22] Filed: Jul. 21, 1995

[51] Int. Cl.$^6$ .................................................. F25B 29/00
[52] U.S. Cl. ........................ 165/223; 165/228; 236/44 C; 236/1 C; 62/176.5
[58] Field of Search .................................. 165/228, 223; 236/44 C, 1 C; 62/176.5

[56] References Cited

U.S. PATENT DOCUMENTS

| | | | |
|---|---|---|---|
| 2,685,433 | 8/1954 | Wintermann | 165/223 |
| 3,786,859 | 1/1974 | Day | 165/263 |
| 3,883,071 | 5/1975 | Meckler . | |
| 3,989,097 | 11/1976 | Schildknecht | 165/228 |
| 4,105,063 | 8/1978 | Bergt | 165/228 |
| 4,253,153 | 2/1981 | Bitterli et al. . | |
| 4,290,480 | 9/1981 | Sulkowski | 165/228 |
| 4,607,498 | 8/1986 | Dinh . | |
| 4,813,475 | 3/1989 | Courrette | 165/223 |
| 4,959,970 | 10/1990 | Meckler . | |
| 5,092,135 | 3/1992 | Cameron . | |
| 5,174,126 | 12/1992 | Cameron . | |
| 5,309,725 | 5/1994 | Cayce . | |
| 5,353,606 | 10/1994 | Yoho et al. . | |
| 5,400,607 | 3/1995 | Cayce . | |

*Primary Examiner*—John K. Ford
*Attorney, Agent, or Firm*—Edward L. Schwarz

[57] ABSTRACT

A space comfort system controls humidity in a space by applying heat to air recirculated to the space when the humidity is excessive and cooling of the air is not required. In a preferred embodiment, the call for heat occurs from the time the humidity increases to a level above a differential band within which is the humidity set point until humidity falls to below the differential band. Heat is applied to the air only when there is no demand for cooling of the air.

3 Claims, 1 Drawing Sheet

REHEAT SYSTEM FOR REDUCING EXCESSIVE HUMIDITY IN A CONTROLLED SPACE

BACKGROUND OF THE INVENTION

In the past, people have felt that temperature-based control provided adequate comfort in closed spaces such as residential dwellings. The majority of such systems have an air recirculating system to heat the recirculated air if the space temperature as sensed by a thermostat is below a comfort range and cool the recirculating air if above the comfort range. It is well known that the relative humidity of air increases as its temperature is decreased, say by contact with a cool surface, until the dew point is reached, at which time relative humidity is 100% and water vapor starts to condense from the air onto the cool surface. In most cases the air conditioning unit is designed and its capacity is selected so that while cooling the air, air temperature within the air conditioner plenum adjacent to the heat exchanger is also lowered to below its dew point thereby condensing a portion of the humidity in the air passing through the plenum as well. When this cooled air with a part of its water vapor condensed in the air conditioner mixes with the air in the controlled space, the humidity of the space is reduced as well.

In many situations, this is adequate to assure comfort within the closed space. Experience shows that relative humidity need not be controlled as accurately as temperature in order to achieve comfort. Typically, if relative humidity can be held between approximately 30% and 50%, people within the closed space will be comfortable. In the majority of conditions, where high humidity is accompanied with relatively high temperature, the conventional approach outlined above is sufficient to keep relative humidity within or close to its comfort range. There are many situations however, where ignoring actual relative humidity achieved by conventional cooling is not adequate. For example, in some climates temperature is not far above the normal comfort range, but relative humidity is very high. Cooling the air results in a closed space with relative humidity far above the comfort range. In other situations, it is advantageous to control relative humidity more closely than the hit or miss approach of simply cooling recirculating air and thereby removing an indeterminate amount of water vapor from the air in the closed space. For example, glued furniture joints may weaken because of frequent humidity swings. Musical instruments such as pianos, harpsichords, guitars, violins, etc. may be damaged or their tuning harmed by frequent humidity changes. Certain house plants do not thrive if the humidity is consistently outside a relatively small range. Persistently high humidity can cause mildew of walls and clothes.

In larger environmental control systems it is possible to provide both cooled and dehumidified air from the air conditioning and heated air from the heating plant to the controlled space. In these systems, the heating and air conditioning can operate simultaneously. By providing more cooling than is needed to achieve the desired temperature in the controlled space, additional water vapor can be condensed from the recirculating air. Simultaneously providing heated air raises the space air temperature to within the comfort level.

Residential and small commercial spaces using recirculating air temperature control are not so easy to control in this way, and are the focus of this invention. The temperature in these spaces is controlled by a system including a plenum, a return air duct connected to provide air from the space to the plenum, and a conditioned air duct connected to allow air flow from the plenum to the space. A fan within the plenum creates a pressure differential within the plenum which extracts air from the space through the return air duct and forces the extracted air through the conditioned air duct into the space after its temperature and humidity has been changed. A heating unit which is usually either a furnace or heat pump and which operates responsive to a first value of a heating active signal has a heat exchanger within the plenum. An air conditioning unit operating responsive to a first value of a cooling active signal has a heat exchanger within the plenum downstream from the heating unit heat exchanger. A temperature sensor within the space supplies a temperature signal encoding a value indicative of the internal air temperature of the space and a humidity sensor within the space provides a humidity signal encoding a value indicative of the humidity level in the air within the space. A set point generator providing a temperature set point signal and a humidity set point signal respectively encoding a temperature set point value and a humidity set point value. Of course, the set point generator forms a part of the thermostat in most installations.

Because the furnace heat exchanger is typically positioned upstream in the duct or plenum from the air conditioning heat exchanger, it is obvious that providing heat to recirculating air just prior to it being cooled will not allow humidity control. Accordingly, a different procedure is needed to allow humidity control in spaces having such temperature control units.

BRIEF DESCRIPTION OF THE INVENTION

I have developed a controller which can operate installations such as that described above to control the humidity level in the controlled space quite accurately. Such a controller includes a heating demand detector receiving the humidity signal and the humidity set point signal. The heating demand detector provides a heat demand signal having a first value responsive to a preselected relationship between the value encoded in the humidity signal and the value encoded in the humidity set point signal and a second value otherwise. I intend that this preselected relationship will exist when the value in the humidity signal exceeds the value in the humidity set point signal in certain ways. In my preferred embodiment, the preselected relationship first comes into existence when the value in the humidity signal is greater than the humidity set point value plus a non-negative offset value. The preselected relationship continues until the value in the humidity signal falls below the humidity set point value less a non-negative offset value. Defining the relationship in this way prevents rapid cycling of the heating unit.

A cooling demand detector in the controller receives the temperature signal from the temperature sensor and the temperature set point signal from the set point generator. Responsive to the value encoded in the temperature signal exceeding the value encoded in the temperature set point signal, the cooling demand detector provides to the air conditioning unit, a cooling active signal having its first value, and a cooling active signal having its second value otherwise. The controller also includes a heating demand element receiving the cooling active signal and the heat demand signal, and responsive to the first value of the heat demand signal and the second value of the cooling active signal, providing a heating active signal having its first value to the heating unit, and a heating active signal having its second value otherwise.

It can thus be seen that this controller causes the heating unit to operate when there is no call for cooling and the measured space humidity has some preselected relationship to the value encoded in the humidity set point signal, normally when the space humidity is higher than the humidity set point.

DESCRIPTION OF THE PREFERRED EMBODIMENT

Figure 1:
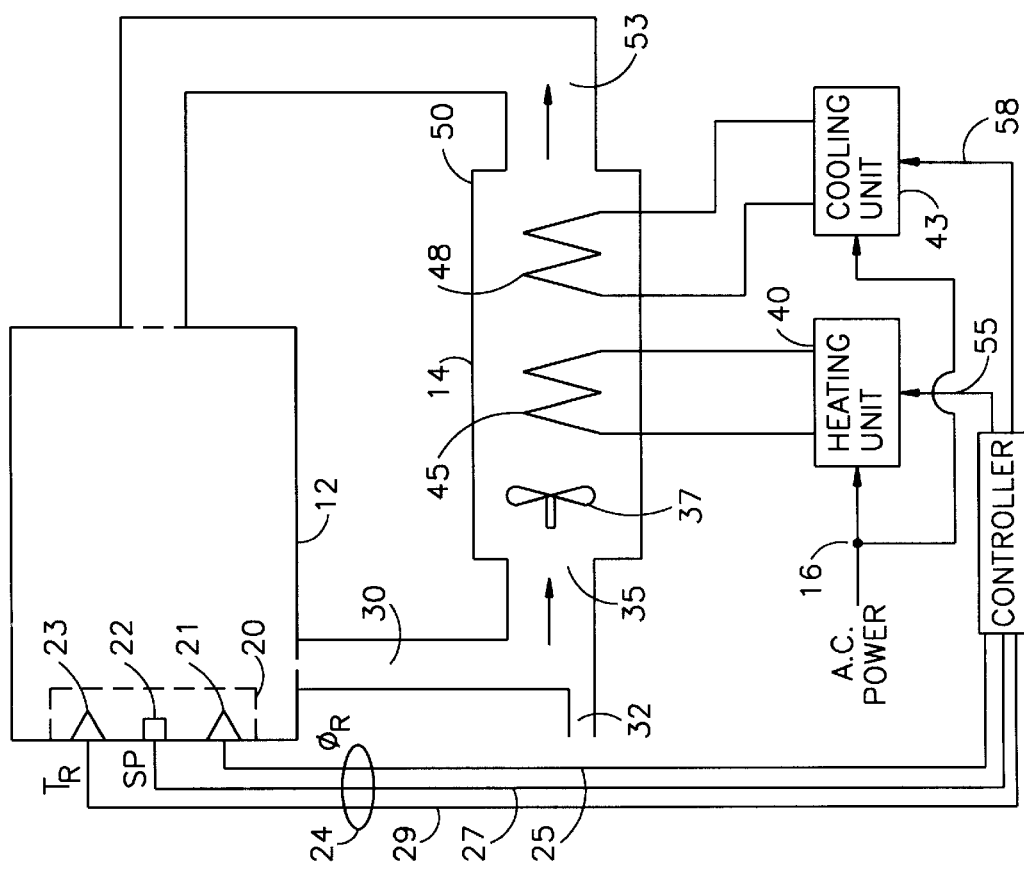
FIG. 1 is a block diagram, including the controller, of apparatus for controlling temperature and relative humidity in an enclosed space.

FIG. 1 shows a typical installation in which the subject invention is incorporated. The installation is designed to maintain selectable temperature and humidity levels within a space 12, typically an area occupied by humans although space 12 could as easily be occupied by livestock or by equipment requiring specialized temperature and humidity levels. Conventional parts of this installation include a heating unit 40 and a cooling unit 43 each requiring an AC power source 16 for proper functioning. Heating unit 40 will typically be a conventional forced air furnace burning gas or oil for heat. A duct or pipe allows a fluid heated by the heating unit 40 to flow to a first heat exchanger 45 mounted within a plenum 14. Heating unit 40 operates to provide heat to heat exchanger 45 responsive to a heating active signal provided on path 55.

Cooling unit 43 typically comprises an air conditioning unit having a second heat exchanger 48 mounted within plenum 14. Cooling unit 43 provides cooled fluid to its heat exchanger 48 responsive to a cooling active signal provided on path 58. Cooling unit 43 and heat exchanger 48 are designed to cool excessively humid air flowing through plenum 14 to below its dew point temperature, to thereby remove humidity from the air.

Plenum 14 is connected to receive through duct 30, return air from space 12 as indicated by the arrow. The return air in duct 30 may be mixed with a fraction of fresh air supplied by duct 32. Air which has been heated or cooled within plenum 14 is supplied to space 12 through a fresh air duct 53 as indicated by the arrow therein. A fan 37 usually positioned at the inlet 35 of plenum 12 creates a pressure drop which causes the flow of air out of space 12 and through duct 30 to plenum 12 and past heat exchangers 45 and 48 to duct 53.

A user interface module 20 is mounted on a wall of space 12. Module 20 is shown in FIG. 1 for easier understanding as connected to a controller 10 by multiple paths 25, 27, and 29, each dedicated to carrying a single specific signal. In the preferred commercial embodiment there are many more signals than three which are exchanged by module 20 and controller 10. It is easy to implement the exchange of this multiplicity of signals with a single bidirectional serial communication path symbolized by ring 24. With such a serial path 24, individual signals may be transmitted either during assigned time slices or with individual identifier codes, either of which methods allow the receiving device to determine the type of parameter encoded in the signal.

Encoding and identifying the various signals exchanged by the module 20 and the controller 10 is only one set of functions which module 20 and controller 10 perform. There are also the many control functions involved with properly operating the heating and cooling units and the fan, and allowing the user to communicate with controller 10. While dedicated hardware is one structure possible for this system, more normally module 20 and controller 10 will each comprise a microprocessor programmed to perform or control the various functions required for the device, including communication functions with the other device.

It is convenient to implement the communication functions here between the microprocessors with a commercially available chip set based on one of the serial communication protocols. These chip sets provide a convenient means of reliably communicating over the distances required here with a simple twisted wire pair. No further discussion of these issues are needed. The reader should simply recognize that the use of three separate data paths 25, 27, and 29 simplify the communication aspects of this invention.

It is also appropriate to briefly discuss the use of microprocessors to implement this invention. First of all, the reader should recognize that the functions of this invention can be provided by a digital device comprising a number of intercommunicating hardware digital elements. (By digital element is meant an element which provides digital, i.e. 0 and 1 logic levels, output signals in response to digital or analog input signals.) It has long been recognized that a computer such as a microprocessor can be programmed to function as and indeed structurally become, almost any digital electronic element. This occurs by virtue of the way in which a computer can execute the instructions forming the program controlling its operation.

The instructions controlling operation of a computer can be considered to have a number of groups, each intended to cause the computer to emulate the operation of one of the digital elements of the digital device. Execution of each group of the instructions causes the computer to temporarily become an actual hardware digital element of the device. The instructions are scripted so that their execution causes the computer to emulate the function of the corresponding hardware digital element. A computer of course is nothing more than electronic circuitry, and this circuitry physically becomes each individual digital element of the entire device for each brief period of time while executing instructions having that purpose.

It is axiomatic of course that every digital element in these types of digital devices provides one or more digital output signals when active. These signals have a pattern dictated by the digital input signals which the hardware digital element receives. During the time a computer executes instructions causing it to become a particular digital element, elements of the computer emit digital signals functionally similar to that which the corresponding hardware digital element would issue when receiving functionally similar input signals. In the computer emulation of a digital device, individual digital elements come into existence sequentially. Therefore, it is not possible to directly transmit the output signal of one digital element to the input terminals of other digital elements. Instead, the computer while emulating each digital element, stores in the computer's memory the information content of the data pattern or digital level of the signal(s) produced by executing the group of instructions dedicated to emulating that digital element. The information content in this data pattern or digital level is equivalent to the information content of the output signal which that emulated digital element would produce when receiving the specified input signals. The output pattern or level is thus available to the computer from its memory when it becomes another digital element of the digital device by executing another group of instructions. By retrieving that stored information content, the computer can recreate the original output signal from which the stored data or signal was formed for use as an input signal. This recreated signal is thus available to every digital element to be emulated in the future to allow that digital element to properly perform its functions.

Thus it is easy to see that one can replace with a computer executing appropriate software, nearly every group of hardware digital elements having interconnected signal paths between them which allow communication of data. In general, the functional equivalent of any digital device can be formed by such a computer when appropriate software is loaded into it. The cheapness and reliability of these small microprocessors makes it preferable to implement a digital device with them. It should be kept in mind though, that the implementation is for all practical purposes hardware based in the final analysis. No further attention need be paid to the precise implementation of the system of this invention since all which use the teachings of this patent are deemed equivalent.

In the apparatus of FIG. 1, the various space comfort control functions are implemented within controller 10 and more particularly within the microprocessor type of computer forming a part of it. Module 20 is located within space 12 and houses the user interface and the individual sensors which among other things sense temperature and humidity within space 12. At the present time, systems usually rely on control of temperature and humidity to provide comfort for human and animal occupants of space 12.

Humidity sensor 21 is shown as a single unit in FIG. 1, but in actuality comprises an analog sensor element which cooperates with the internal microprocessor of module 20 to provide a digital humidity signal in which is encoded a value $\emptyset_R$ indicative of the space 12 humidity. I prefer that $\emptyset_R$ be relative humidity, but it is also possible for the $\emptyset_R$ value to indicate dew point temperature or wet bulb temperature, as all three parameters provide some measure of the humidity level within space 12. I prefer relative humidity as the humidity parameter for space 12 because there are a number of sensors available which more or less directly measure this parameter with quite good accuracy.

An A/D converter which may be a part of the microprocessor within module 20 receives an analog humidity signal from the analog sensor element. The A/D converter provides a humidity signal encoding a digital value of the humidity parameter. This digital humidity signal encoding the $\emptyset_R$ value is sent to controller 10 on the path 25 forming a part of serial communication path 24.

Module 20 also includes a temperature sensor 23 which typically will include a conventional analog temperature sensor whose analogy temperature signal output is provided to an A/D converter element forming a part of the microprocessor which is internal to module 20. The structure and operation of temperature sensor 23 is similar to that of humidity sensor 21. Temperature sensor 23 provides a digital temperature signal on path 29 which encodes a value $T_R$ indicative of room or space temperature. Experience shows that merely measuring room air temperature is not as good an indication of comfort for humans in space 12 as a composite value which takes into account factors like wall temperature and air movement within the space. I prefer to use a value $T_R$ which more accurately than air temperature indicates perceived human comfort of space 12.

Module 20 includes a user interface which accepts user inputs specifying individual parameters to control the operation of controller 10. In this respect, module 20 further comprises a set point signal generator 22. Set point signal generator 22 is typically a keypad on the module face although it could also be a rotatable knob for each of the temperature and humidity parameters. The user can manipulate the keys in the keypad to provide signals indicating a user-preferred temperature set point value and humidity set point value. These two set point values are encoded in a composite set point signal carried on path 27. Again, note that these values are digitally encoded in the signal on path 27 provided to controller 10 as a part of the serial data path 24. Since the set point values can most easily be generated initially in a digital format it is only necessary to serialize them and send them to controller 10 in path 27.

Controller 10 receives the signals provided by module 20 and records the values encoded in them within a memory which is within controller 10. As mentioned earlier, controller 10 has a microprocessor for performing its various functions. A typical microprocessor will have a memory within it which can serve to record the values sent from module 20 to controller 10. When required for performing a particular function, the microprocessor in controller 10 can retrieve the needed value from this memory and encode this value in a signal which is identical in terms of information content to the signal provided by module 20 and which was recorded earlier. Since an internal microprocessor signal must be compatible with the internal microprocessor logic elements, it is almost certain that a signal encoding a value previously furnished by module 20 will have different voltage, frequency, duration, etc. characteristics than the signal provided by module 20. For convenience however, an internal microprocessor signal path which carries a particular parameter value provided by module 20 will be given a reference number and name which is the same as that assigned to the path which carried that parameter value to controller 10. To distinguish internal microprocessor paths, reference numbers for them will have the "prime" suffix, but the numeric portion will be the same as shown in FIG. 1.

In response to the signals provided by module 20 and also as a result of the logic built into the controller 10 microprocessor software, controller 10 provides a number of signals for controlling the environmental conditions within space 12. The two relevant to this invention are the heating active signal carried on path 55 and the cooling active signal carried on path 58, and which were mentioned earlier in connection with a discussion of heating unit 40 and cooling unit 43. There will also typically be a signal for causing fan 37 to operate, and there may well be other control signals such as damper control signals for controlling fresh air inlet 32, etc.

Figure 2:
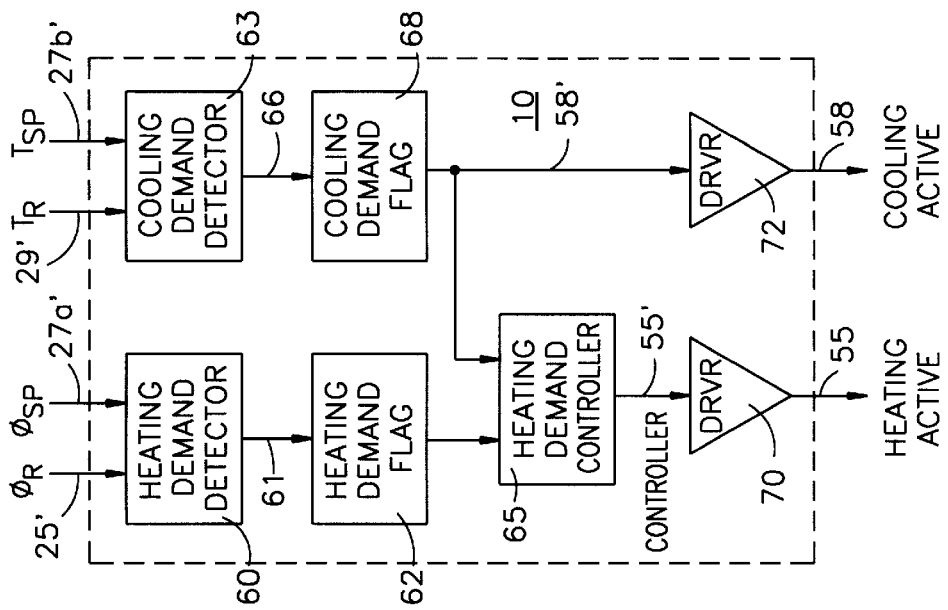
FIG. 2 is a block diagram of the components within the controller comprising the invention.

The invention involves an improvement to controller 10, and its features are shown in FIG. 2. The reader should realize that controller 10 will comprise many other elements besides those shown in FIG. 2. The $\emptyset_R$ value encoded in the humidity signal on path 25' and the $T_R$ value encoded in the temperature signal on path 29' form two of the inputs to the apparatus of FIG. 2. As mentioned earlier, the signal paths 25' and 29' in FIG. 2 are actually internal to the controller 10 microprocessor but carry the reference numbers assigned to the paths in FIG. 1 carrying the same parameters. Each of these signals will encode the value most recently received by the controller 10 of the parameter whose descriptor it carries. The particular signal path may exist only for short periods of time as the parameter value is needed for executing the instruction group which configures the microprocessor as the digital element shown as receiving the specified signal. The set point signal carried on path 27 was described earlier as including two components, a humidity set point value $\emptyset_{SP}$ and a temperature set point value $T_{SP}$. In my preferred embodiment, a signal path 27a' internal to the controller 10 microprocessor carries a humidity set point signal encoding a humidity value $\phi_{SP}$ when commands are executed which retrieves this $\phi_{SP}$ value from the microprocessor memory. Similarly, a signal path 27b' internal to the controller 10 microprocessor carries a temperature set point signal encoding a temperature value $T_{SP}$ when commands are executed which retrieves this value from the microprocessor memory.

A cooling demand detector 63 comes into existence as a result of the execution of a first group of instructions by the controller 10 microprocessor. Cooling detector 63 receives from the controller 10 microprocessor memory the temperature value $T_R$ on path 29' and the temperature set point value $T_{SP}$ on path 27b'. For purposes of this invention, it is adequate to assume that cooling detector 63 does nothing more than test whether $T_R$ is larger than $T_{SP}$ and if so then cooling detector 63 issues a first cooling active signal on path 66 having a first value. In a typical temperature control algorithm, an anticipation factor at least to prevent overshoot or undershoot would be applied. A suitable way to analyze this situation is to assume that $T_{SP}$ is adjusted by a factor which builds anticipation and any other necessary corrections into the temperature control algorithm. If $T_R$ is less than or equal to $T_{SP}$ then cooling detector 63 issues the first cooling active signal on path 66 with a second value. The first cooling active signal is an internal microprocessor signal.

Since the cooling detector 63 exists only when the first group of instructions is executed, and since the first (and in fact, each) group of instructions is periodically executed at one second or longer intervals, there are significant periods of time when the cooling detector 63 does not exist and hence no first cooling active signal exists. In order to make the information content of the first cooling active signal available during these intervals, the first cooling active signal serves as an input to a cooling demand flag element 68. Cooling demand flag 68, which is a binary device having first and second different memory states, will typically comprise a flip-flop or one bit of a register or a memory location within the controller 10 microprocessor. These memory states are dependent on the most recent value of the first cooling active signal. The first value of the first cooling active signal sets the cooling demand flag to its first state, and the second value of the first cooling active signal sets the cooling demand flag to its second state. The state of cooling flag 68 is changed only by a first cooling active signal with a value different from the most recent previous first cooling active signal.

The present memory state of cooling flag 68 is encoded in a second cooling active signal on path 58' having first and second values corresponding to the first and second memory states of cooling flag 68. The second cooling active signal is an internal microprocessor signal which is available at least as needed by other elements within the microprocessor, and which if cooling flag 68 is a register or flip-flop may be continually available.

The second cooling active signal on path 58' is modified by a cooling signal driver 72 into a third cooling active signal on path 58 whose format is compatible with the interface specifications of cooling unit 43. The third cooling active signal also has first and second values, but must be continuously present. If cooling flag 68 is not a memory element of the type which makes the second cooling active signal continuously available to driver 72, then driver 72 must include a memory element so that the third cooling active signal on path 58 will be continuously present. The first value of the third cooling active signal on path 58 activates cooling unit 43 to begin cooling air flowing through plenum 14. Thus, one can see that if the first cooling active signal has its first value, the third cooling active signal will have its first value as well, and air flowing through plenum 14 will be cooled.

In a preferred embodiment, if the cooling detector 63 detects that $T_R$ is smaller than $T_{SP}-T_{DV}$ where $T_{DV}$ is a temperature differential, then cooling detector 63 issues a first cooling active signal on path 66 having a second value. $T_{DV}$ is typically a constant value set during design of the entire control system. Cooling flag 68 and driver 72 respond to the second value of the first cooling active signal on path 66 by causing driver 72 to provide on path 58 to cooling unit 43 a third cooling active signal having its second value. In response, cooling unit 43 stops cooling air which is flowing through plenum 14. The reader will understand that unshown elements of controller 10 cause fan 37 to operate whenever the first cooling active signal has its first value, so that air from space 12 and the outside is forced through plenum 14 for cooling or heating.

A heating demand detector 60 comes into existence during the execution of a second group of instructions by the controller 10 microprocessor. Heating demand detector 60 receives from the controller 10 microprocessor memory where they have been previously recorded, the humidity value $\phi_R$ on path 25' and the humidity set point value $\phi_{SP}$ on path 27a'. If the humidity value $\phi_R$ exceeds the humidity set point value $\phi_{SP}$, detector 60 provides a first heating demand signal having a first value on a path 61 internal to the controller 10 microprocessor. If the humidity value $\phi_R$ is less than $\phi_{SP}-\phi_{DV}$ where $\phi_{DV}$ is a humidity differential value, heating detector 60 provides a second value of the heating demand signal on path 61. The first heating demand signal is provided to a heating demand flag element 62 which is set to either a first or second memory state accordingly as the first heating demand signal has its first or second value. Heating flag 62 is similar to cooling demand flag element 68, and provides a second heating demand signal having first or second values as flag 62 has its first or second memory state. The differential value $\phi_{DV}$ adds stability to the operation of this equipment by creating the switching interval between $\phi_{SP}$ and $\phi_{SP}-\phi_{DV}$. The reader should note that there are alternative ways to create a switching interval using $\phi_{DV}$, say by defining the switching interval to be between $\phi_{SP}+\phi_{DV}$ and $\phi_{SP}$ or between $\phi_{SP}+\frac{1}{2}\phi_{DV}$ and $\phi_{SP}-\frac{1}{2}\phi_{DV}$. These are all equivalent expressions, each having a switching differential of $\phi_{DV}$. If relative humidity is used as the humidity parameter, I prefer a switching differential $\phi_{DV}$ of approximately 5–10% of relative humidity. Typically the humidity set point $\phi_{SP}$ will be user-adjustable, but values in the range of 40–50% if relative humidity is used as the humidity parameter will usually provide comfort in space 12.

A third group of microprocessor instructions causes the microprocessor to become a heating demand controller 65. Heating controller 65 receives the second heating demand signal from heating flag 62 and the second cooling active signal previously generated by cooling detector 63 and available on path 58' from cooling flag 68. If the second cooling active signal has its second value and the second heating demand signal has its first value, then heating controller 65 provides a first heating active flag having its first value on path 55'. Any other combination of the second heating demand signal and the second cooling active signal values causes the first heating active flag to take its second value. Demand controller 65 is thus essentially a particular type of AND gate providing the first heating active signal with its first value responsive to both the first value of the second heating demand signal and the second value of the second cooling active signal.

The first heating active signal on path 55' is provided to a heating signal driver 70 which operates in a manner analogous to cooling signal driver 72, conditioning and reformatting the characteristics of the first heating active signal for compatibility with heating unit 40. The output of driver 70 is a second heating active signal having a first value responsive to the first value of the first heating active signal and a second value responsive to the second value of the first heating active signal. The first value of the second heating active signal causes heating unit 40 to operate and the second value of the second heating active signal causes heating unit 40 to suspend operation. Note that heating unit 40 in this mode of operation is active on the basis of humidity conditions as well as temperature conditions within space 12.

It is useful to describe the operation of this control system in words. So long as there is a request for operation of the cooling unit 43, the heating unit 40 will not be activated. Or, so long as humidity stays below the humidity set point, heating will not be activated. Only if humidity is too high and the cooling unit 43 is not operating will heating unit 40 operate. By operating the heating unit 40, the space temperature $T_R$ is artificially raised without increasing the mass concentration of water vapor in the air. Raising the space 12 temperature results in more frequent operation of cooling unit 43 which condenses water out of the air flowing from space 12 through plenum 14. This further dried air is then returned to space 12 and drops the humidity of the air in space 12.

It would superficially appear that this system will increase the amount of energy required to hold space 12 within a range of comfort. In fact however, the substantial reduction in space 12 humidity which this system produces may allow the actual temperature of space 12 to be held at a substantially higher value which will require so much less cooling energy that overall energy requirements will be reduced. This will certainly not be universally true, but I believe that in certain climates or weather situations, a potential for energy savings exists.

The preceding has described the invention which I claim as follows:

1. Apparatus for controlling both temperature and humidity in a space receiving heat and humidity, to preselected temperature and humidity set points respectively, said apparatus including a) a plenum; b) a return air duct connected to provide air from the space to the plenum; c) a conditioned air duct connected to allow air flow from the plenum to the space; d) a fan within the plenum for extracting air from the space through the return air duct and forcing the extracted air through the conditioned air duct into the space; e) a heating unit operating responsive to a first value of a heating active signal to heat air flowing through the plenum and not operating responsive to a second value of the heating active signal, and having a heat exchanger within the plenum; f) an air conditioning unit operating responsive to a first value of a cooling active signal to cool air flowing through the plenum and not operating responsive to a second value of the cooling active signal, and having a heat exchanger within the plenum; g) a temperature sensor within the space supplying a temperature signal encoding a value indicative of the internal air temperature of the space; h) a humidity sensor within the space providing a humidity signal encoding a value indicative of the humidity level in the air within the space; and i) a set point generator providing a temperature set point signal and a humidity set point signal respectively encoding a temperature set point value and a humidity set point value, wherein the controller comprises:

I) a heating demand detector receiving the humidity signal and the humidity set point signal, and providing a heating demand signal having a first value during a heat demand interval starting at the time the value in the humidity signal while increasing, crosses the humidity set point value plus a first non-negative differential value and ending at the time the value in the humidity signal while decreasing, crosses the humidity set point value minus a second non-negative differential value and a second value otherwise;

II) a cooling demand detector receiving the temperature signal and the temperature set point signal, and responsive to the value encoded in the temperature signal exceeding the value encoded in the temperature set point signal, providing to the air conditioning unit a cooling active signal having its first value, and a cooling active signal having its second value otherwise; and III) a heating demand element receiving the cooling active signal and the heating demand signal, and responsive to the first value of the heating demand signal and the second value of the cooling active signal, providing a heating active signal having its first value to the heating unit, and a heating active signal having its second value otherwise.

2. The apparatus of claim 1, wherein the heating demand detector further comprises apparatus providing the heating demand signal with its first value during a heat demand interval starting at the time the value in the humidity signal while increasing, crosses the humidity set point value plus a first positive non-zero differential value and ending at the time the value in the humidity signal while decreasing, crosses the humidity set point value minus a second positive differential value.

3. Apparatus for controlling both temperature and humidity in a space receiving heat and humidity, to preselected temperature and humidity set points respectively, said apparatus including a) a plenum; b) a return air duct connected to provide air from the space to the plenum; c) a conditioned air duct connected to allow air flow from the plenum to the space; d) a fan within the plenum for extracting air from the space through the return air duct and forcing the extracted air through the conditioned air duct into the space; e) a heating unit operating responsive to a first value of a heating active signal to heat air flowing through the plenum and not operating responsive to a second value of the heating active signal, and having a heat exchanger within the plenum; f) an air conditioning unit operating responsive to a first value of a cooling active signal to cool air flowing through the plenum and not operating responsive to a second value of the cooling active signal, and having a heat exchanger within the plenum; g) a temperature sensor within the space supplying a temperature signal encoding a value indicative of the internal air temperature of the space; h) a humidity sensor within the space providing a humidity signal encoding a value indicative of the humidity level in the air within the space; and i) a set point generator providing a temperature set point signal and a humidity set point signal respectively encoding a temperature set point value and a humidity set point value, wherein the controller comprises:

I) a heating demand detector receiving the humidity signal and the humidity set point signal, and providing a first heating demand signal having a first value during a heat demand interval starting at the time the value in the humidity signal while increasing crosses the humidity set point value plus a first positive differential value and ending at the time the value in the humidity signal while decreasing crosses the humidity set point value minus a second positive differential value;

II) a cooling demand detector receiving the temperature signal and the temperature set point signal, and responsive to the value encoded in the temperature signal exceeding the value encoded in the temperature set point signal, providing to the air conditioning unit a first cooling active signal having its first value, and a first cooling active signal having its second value otherwise;

III) a heating demand flag element receiving the first heating demand signal, recording the value of the first heating demand signal, and providing a second heating demand signal dependent on the recorded value of the first heating demand signal;

IV) a cooling demand flag element receiving the first cooling active signal, recording the value of the first cooling active signal, and providing a second cooling active signal dependent on the recorded value of the first cooling active signal; and V) a heating demand element receiving the second cooling active signal and the second heating demand signal, and responsive to the first value of the second heating demand signal and the second value of the second cooling active signal, providing a heating active signal having its first value to the heating unit, and a heating active signal having its second value otherwise.

* * * * *